United States Patent [19]

Hennells

[11] Patent Number: 4,813,655
[45] Date of Patent: Mar. 21, 1989

[54] CONTROL VALVE FOR GAS SPRING

[75] Inventor: Ranson J. Hennells, Plymouth, Mich.

[73] Assignee: Rantom, Inc., Canton, Mich.

[21] Appl. No.: 180,485

[22] Filed: Apr. 12, 1988

Related U.S. Application Data

[63] Continuation-in-part of Ser. No. 119,813, Nov. 12, 1987, abandoned, which is a continuation-in-part of Ser. No. 53,175, May 21, 1987, abandoned.

[51] Int. Cl.$^4$ ............................................. F16F 9/43
[52] U.S. Cl. ......................... 267/64.28; 137/102; 188/322.21; 251/63.4; 267/119
[58] Field of Search ................. 267/64.11–64.28, 267/119, 124–130, 137, 113, 118; 188/322.21; 137/102, 536, 538, 540; 251/63.4, 63.5; 91/442, 268; 92/163, 164, 169, 143, 152

[56] References Cited

U.S. PATENT DOCUMENTS

| | | | |
|---|---|---|---|
| 3,034,527 | 5/1962 | Hennells | 137/102 |
| 3,281,138 | 10/1966 | Oster | 267/64.28 X |
| 4,257,580 | 3/1981 | Schnitzius | 267/65 R |
| 4,342,448 | 8/1982 | Wallis | 267/119 |
| 4,519,011 | 7/1970 | Pennanen | 267/64.28 X |
| 4,550,899 | 11/1985 | Holley | 267/119 |
| 4,662,616 | 5/1987 | Hennells | 267/64.28 |
| 4,664,362 | 5/1987 | Hennells | 267/119 |
| 4,721,289 | 1/1988 | Hennells | 267/64.28 |

Primary Examiner—Douglas C. Butler
Attorney, Agent, or Firm—Flynn, Thiel, Boutell & Tanis

[57] ABSTRACT

A gas spring unit having a housing, and a piston assembly slidably supported within and projecting outwardly of the housing. The housing and piston assembly cooperate to define therebetween a pressure chamber which is precharged with a high pressure gas, specifically nitrogen, for absorbing external shock forces as imposed on the piston assembly. A first passage, containing a one-way check valve, extends through the end cap of the housing to permit charging of the pressure chamber with high-pressure gas, and to additionally permit make up gas to be supplied to the chamber. A second passage permits relieving of pressure within the pressure chamber, such as due to overload or when relief of pressure is desired. A movable discharge valve is associated with the second passage, and the opening and closing of the discharge valve is controlled by a control piston which is slidably disposed within the end cap and has opposite ends thereof exposed to the pressure within the first and second passages for controlling the position thereof, and hence controlling the position of the discharge valve.

39 Claims, 4 Drawing Sheets

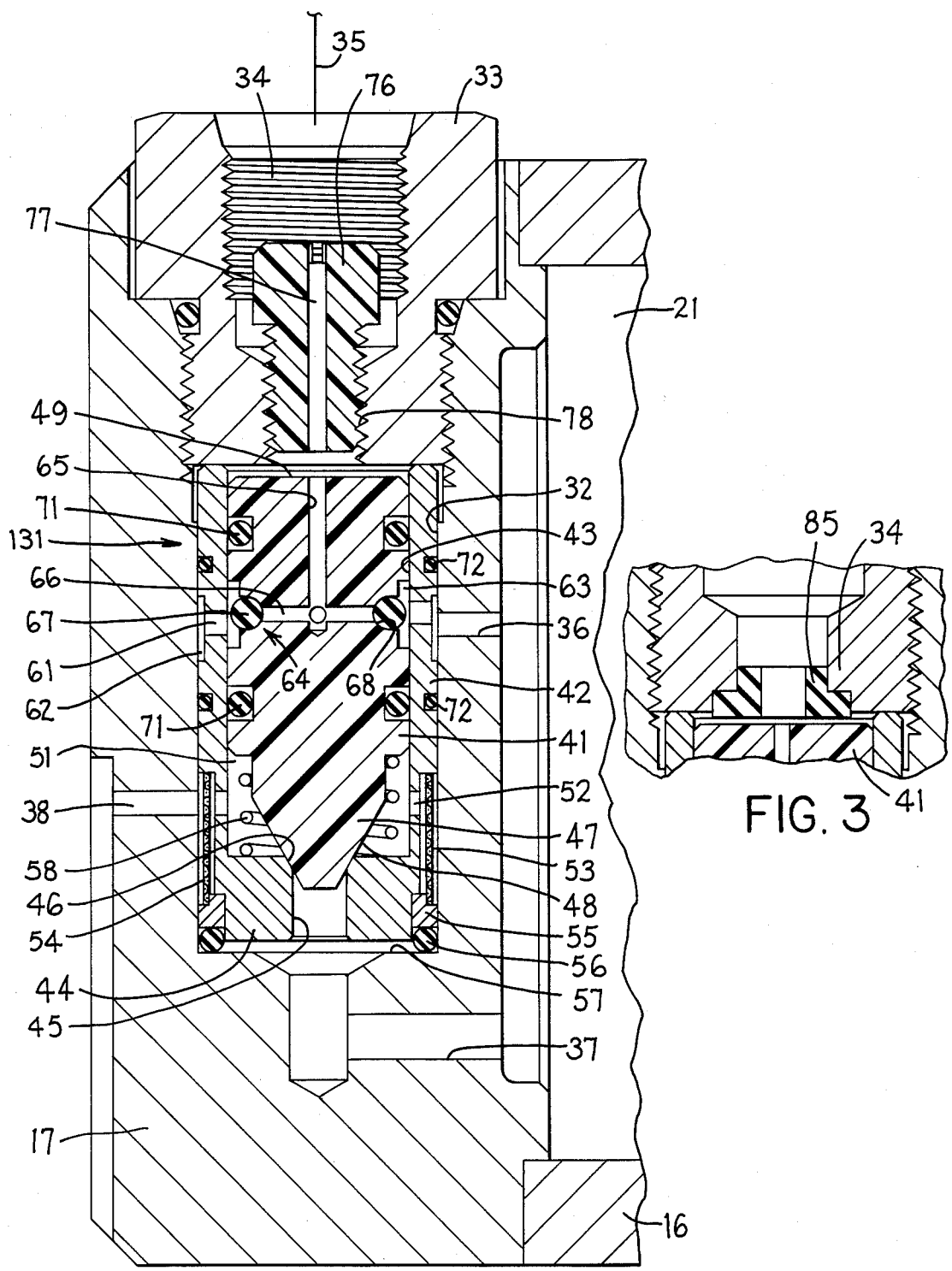

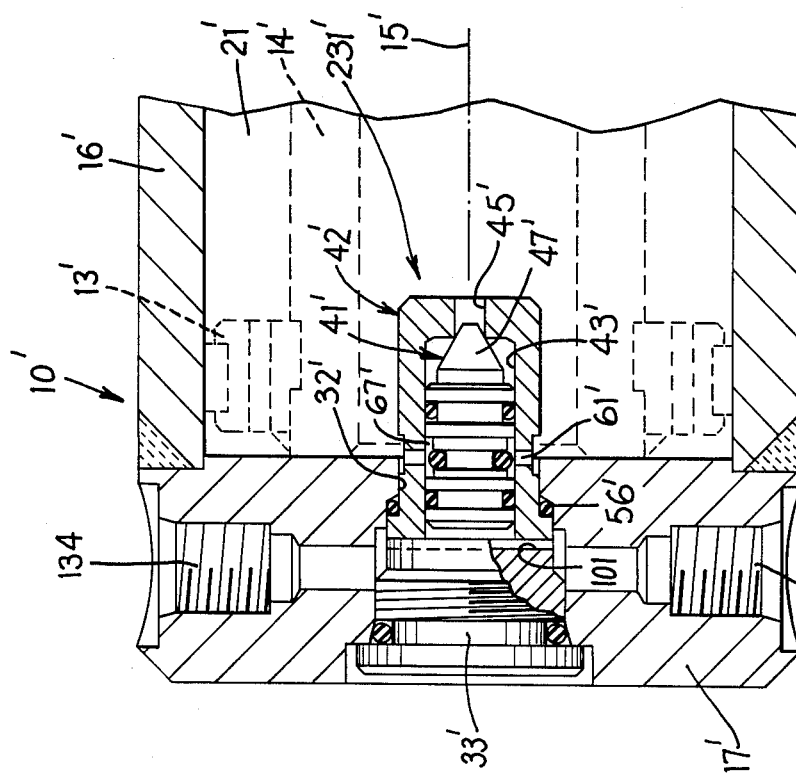
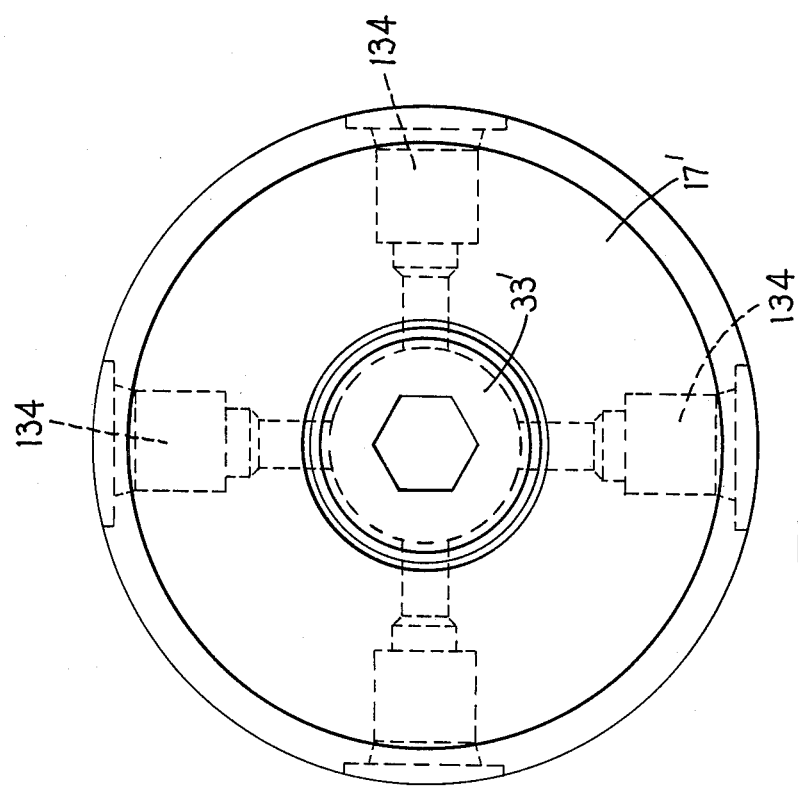

CONTROL VALVE FOR GAS SPRING

CROSS REFERENCE TO RELATED APPLICATION

This application is a continuation-in-part of my copending application Ser. No. 119,813 filed Nov. 12, 1987, now abandoned, which in turn is a continuation-in-part of my copending application Ser. No. 053 175 filed May 21, 1987, now abandoned.

FIELD OF THE INVENTION

This invention relates to a gas compression spring designed for use with high internal pressures and, in particular, to an improved valve arrangement associated with the spring.

BACKGROUND OF THE INVENTION

At the present time, manufacturers who utilize large presses and dies, such as of the type used for forming large sheet metal body parts for automobiles, have attempted to reduce the press size by replacing conventional low-pressure gas springs (typically air springs) with higher pressure springs which are typically filled with nitrogen. This desire to utilize a high-pressure gas springs is obviously predicated on the fact that such spring can be of significantly smaller size while still providing a large force-absorbing capacity due to the high internal gas pressure which exists in the spring. Such high-pressure gas spring, which has been developed for this purpose, is illustrated in my earlier U.S. Pat. No. 4,664,362.

These high-pressure springs, however, do introduce concerns with respect to the safety of such devices and the safety of operating personnel. This is important both during operation of the spring due to the pressure build up therein during application of impact forces thereto, and also when handling of the spring such as during installation, maintenance or removal. In recognition of this need to provide suitable control valves for providing safety against pressure overload, and at the same time provide convenient and safe procedures for discharging high-pressure fluid from the spring, applicant has developed a valve for such purpose and same is disclosed in applicant's earlier U.S. Pat. No. 4,662,616. Additional improvements in such valve are disclosed in applicant's U.S. Pat. No. 4,721,289. While these latter valves have proven to possess desirable structural and functional characteristics, nevertheless further investigation and study of the installation, handling and use characteristics of gas springs of this general type have resulted in applicant's development of still further improvements in such valves so as to significantly improve the performance characteristics of the valves when utilized on high-pressure springs of this type, while at the same time maintaining or improving the overall safety of such system.

In the improved valve arrangement of the present invention, which valve is preferably positioned within a bore formed in the gas spring housing for controlling flow of pressure fluid both into and out of the pressure chamber, the valve arrangement includes a first one-way check valve means coacting between first and second passages for permitting high-pressure gas to be supplied from the first to the second passage and thence into the pressure chamber, while preventing flow in the opposite direction. The valve arrangement also includes a second flow-control valve means coacting with a third passage for controlling flow of gas through the third passage for discharge from the high-pressure chamber. The valve arrangement preferably includes a removable sleeve-like liner supported within the housing bore, and a control piston sealingly and slidably supported within the liner. The one-check valve means is mounted on the control piston, and the flow control valve means includes an annular valve seat formed on the liner for cooperation with an annular valve element which is fixedly associated with the control piston.

In one embodiment of the invention, the control valve means, when opened, such as for permitting manual discharge of the spring or release of excess pressure, permits the gas to be discharged to an external location such as the surrounding atmosphere.

In a further and preferred embodiment of the invention, the opening of the flow control valve means, such as during a period of excessive pressure, permits the gas in the pressure chamber to flow through the third passage past the opened flow control valve means into a fourth passage, the latter communicating through a further one-way check valve means with the first passage so that the gas is automatically resupplied to the supply line (that is, the first passage). This further one-way check valve means is preferably mounted on and carried by the control piston. This arrangement is particularly desirable since, if any leakage occurs past the flow control valve means, then any leaked gas will ultimately be resupplied to the supply line.

In a variation of the preferred embodiment as described above, the valve arrangement is mounted on the end cap of the gas spring housing and is disposed within a bore which extends through the end cap in axial alignment with the axis of the high-pressure spring. The valve arrangement projects through the end cap into the pressure chamber and is accommodated within the hollow interior of the piston. The end cap has a plurality of supply ports opening radially outwardly from the bore through the surrounding side wall of the end cap at a plurality of circumferentially spaced locations to facilitate connection of a selected one of the supply ports to an external pressure source.

Other objects and purposes of the invention will be apparent to persons familiar with systems of this general type upon reading the following specification and inspecting the accompanying drawings.

BRIEF DESCRIPTION OF THE DRAWINGS

FIG. 2 is an enlarged sectional view of a first embodiment of an improved valve arrangement for incorporation into the gas spring unit of FIG. 1.

FIG. 3 is a fragmentary sectional view of a variation for incorporation into the embodiment of FIG. 2.

FIG. 5 is an enlarged sectional view illustrating a variation of the valve arrangement shown in FIG. 4.

FIG. 6 is an end view of the arrangement shown in FIG. 5.

Figure 1:
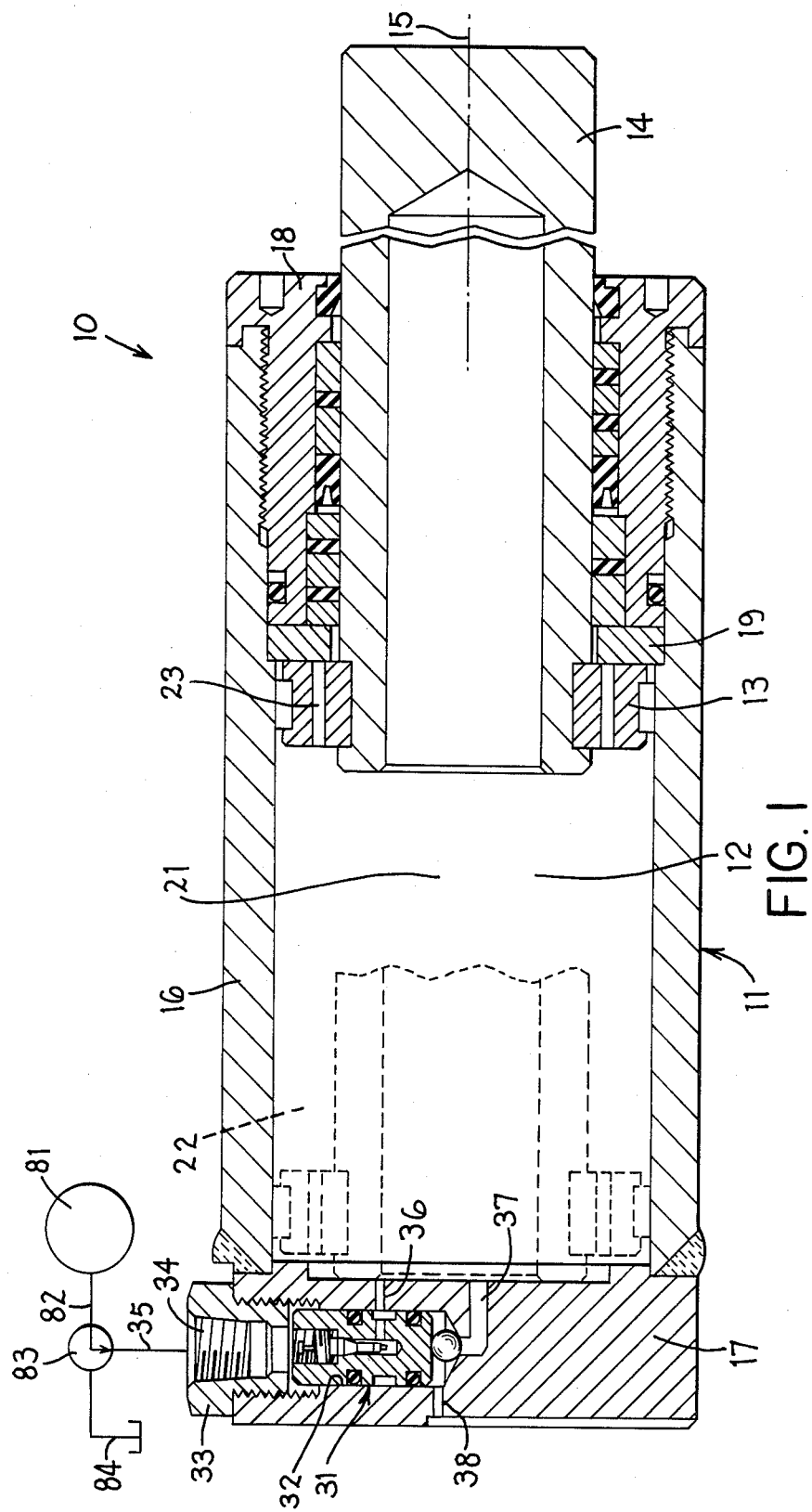
FIG. 1 illustrates a system which incorporates therein a gas spring unit, the latter being illustrated by its central sectional view.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the valve arrangement or spring unit and designated parts thereof. Said terminology will include the words specifically mentioned, derivatives thereof, and words of similar import.

DETAILED DESCRIPTION

FIG. 1 illustrates a gas spring unit 10 which includes a substantially hollow housing 11 defining therein a interior compartment 12. A piston 13 is disposed within the chamber 12 and is secured to the inner end of an elongated piston rod 14 which projects outwardly through one end of the housing, whereby the piston is supported for slidable movement along the longitudinal central axis 15 of the unit.

The housing includes a main body 16 which is of a tubular construction. The body 16 is closed at one end by an end cap 17 which is fixed thereto, as by welding. The other end of body 16 has a further end cap 18 secured thereto. An annular stop ring 19 is stationarily positioned within the body 16 directly adjacent the inner end of the cap 18.

The piston 13 is disposed in slidable engagement with the inner wall of body 16 and divides the interior compartment 12 into a pair of chambers, namely a main pressure chamber 21 and a balancing chamber or reservoir 22. The pressure chamber 21 is defined rearwardly (that is leftwardly) of the piston 13 and includes the hollow interior of the piston rod 14. The reservoir or release chamber 22 is defined forwardly (that is rightwardly) of the piston 13 and comprises the annular region between body 16 and piston rod 14. The piston 13 has one or more ports 23 extending axially therethrough to provide for unrestricted and continuous communication between the chambers 21 and 22 to balance the pressure on opposite sides of the piston.

The structure of gas spring 10, as described above, is conventioned and is explained in greater detail in my U.S. Pat. No. 4,664,362.

To permit filling and recharging of the pressure chamber 21, and to additionally permit the high-pressure within the spring unit to be relieved, either purposefully or in the event of a pressure overload, the spring unit 10 is provided with a valve assembly 31 associated therewith. This valve assembly 31 is preferably integrated directly into the housing, such as in the end cap 17, and provides control over the flow of pressure fluid both into and out of the pressure chamber 21.

The valve assembly 31 is disposed within a bore 32 as formed in end cap 17, which bore has a threaded mouth at the open end thereof for threadably accommodating a conventional fitting 33. This fitting 33 has a standard threaded opening 34 therethrough which is aligned with and communicates with the bore 32 for permitting pressure fluid to be supplied thereto. The threaded opening 34 accommodates a conventional threaded end of a supply pipe 35.

The valve assembly 31 controls flow of pressure fluid from the supply line 35 to a passage 36 which provides communication between the bore 32 and the pressure chamber 21 so as to permit high-pressure gas to be supplied to the latter chamber. The valve assembly 31 also controls the discharge of gas from the pressure chamber 21, and for this purpose the chamber 21 communicates with a further passage 37 which in turn communicates with the closed end of the bore 32. Passage 37 is normally maintained in a closed condition by the valve arrangement 31. Opening of the valve arrangement 31, however, such as due to excessive pressure within the chamber 21, permits the passage 37 to communicate with a further passage 38 which provides communication between the bore 32 and an exterior low-pressure discharge point such as the surrounding environment.

Figure 4:
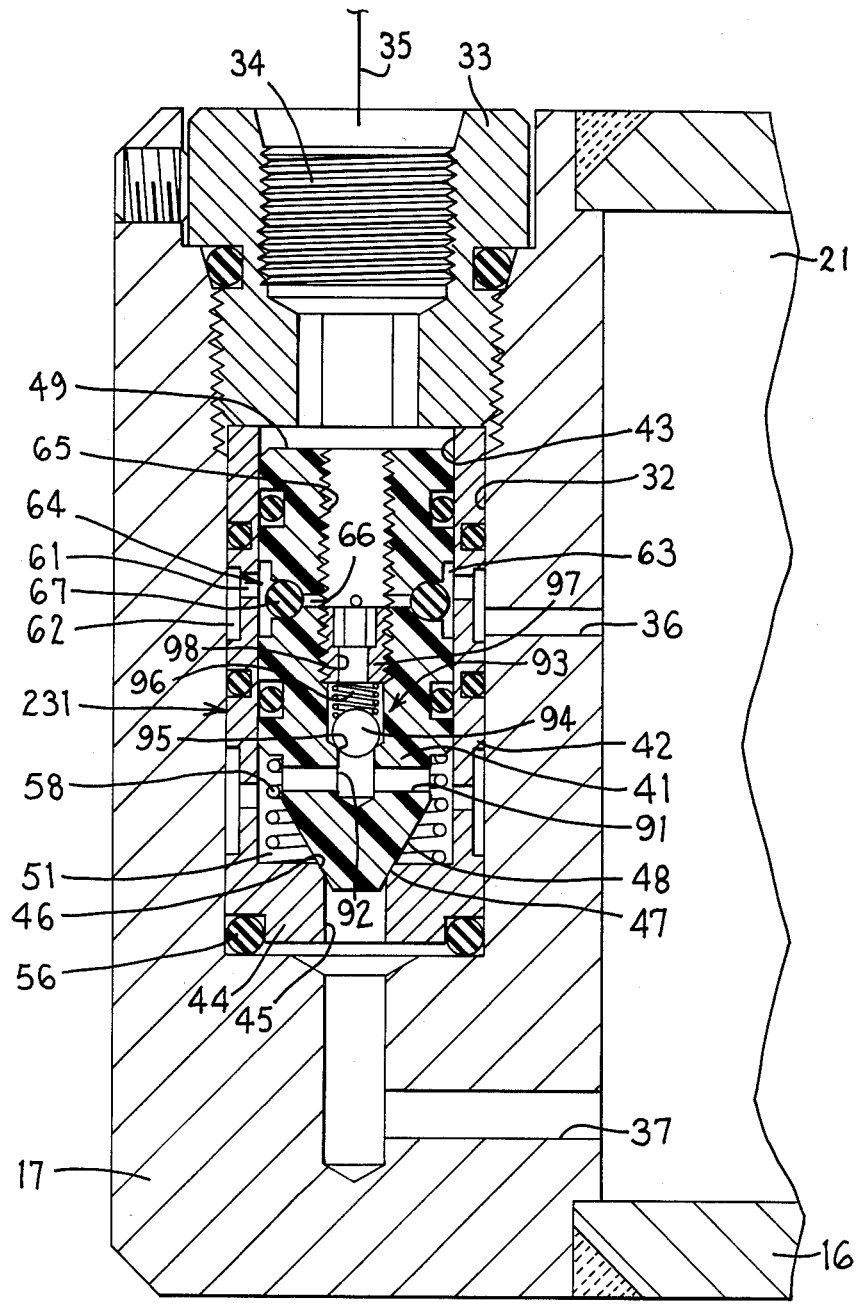
FIG. 4 is an enlarged sectional view illustrating a second and preferred variation of a valve arrangement for incorporation into the air spring unit of FIG. 1.

The structure and operation of the valve arrangement 31 is conventional, and is described in greater detail in my U.S. Pat. No. 4,662,616. The present invention relates to an improved valve arrangement which is used in place of the valve arrangement 31, and embodiments of an improved valve arrangement are illustrated by FIGS. 2, 4 and 5 as described hereinafter.

Referring to FIG. 2, there is illustrated one variation of a valve arrangement usable with the gas spring unit 10 shown in FIG. 1. The valve arrangement 131 of FIG. 2 is substituted for the valve arrangement 31 shown in FIG. 1.

The valve arrangement 131 of FIG. 2 is positioned within the bore 32 formed in the end cap 17 of the spring unit housing, with the valve arrangement 131 being confined in the bore 32 by means of the fitting 33.

The valve arrangement 131 includes a control element or piston 41 which is slidably supported within a one-piece liner 42 which is disposed within the bore 32. The liner 42 is sized so as to be snugly slidably positionable within the bore 32, and the liner itself has a cylindrical bore 43 which extends inwardly from one end thereof over a majority of its axial extent. This bore 43 terminates at an end wall 44 which partially closes off the other end of the liner. The end wall 44 has a small passage or opening 45 extending therethrough in coaxial alignment and communication with the bore 43. Passage 45 is also substantially coaxially aligned with and in communication with one end of the intermediate discharge passage 37. End wall 44 defines thereon, in surrounding relationship to the passage 45, a truncated conical valve seat 46 which is adapted to be sealingly engaged by a valve element 47.

The control piston 41 is slidably and sealingly supported within the bore 42 so as to be shiftable axially therealong between open and closed positions. The control piston 41 has the valve element 47 fixedly, and preferably integrally, associated therewith. In a preferred embodiment, the control piston 41 and its valve element 47 are molded in one piece of a relatively hard plastic material. The hard plastic material for the control piston 41 should have only limited resiliency or elasticity, and should exhibit little cold flow characteristics. In particular, the control piston is preferably constructed of an acetyl polymer, specifically polyoxymethylene, commonly known as Delrin (trademark of DuPont). A high molecular density polymer, such as Delrin 150, is preferred.

The truncated conical valve element 47 defines thereon an exterior annular valve surface 48 which is of a tapered or conical configuration, this conical surface 48 preferably being defined by an included cone angle of about 60°, the latter being generated by an angle of about 30° relative to the longitudinally extending axis of the control piston. This cone angle of 60° can vary by about plus or minus 20°.

The control valve means defined by valve element 47 and valve seat 46 is normally maintained closed by the pressurized fluid in the supply line 35, which pressurized fluid acts against the enlarged upper end face 49 of the control piston to hence maintain it in the lowermost position illustrated by FIG. 2. However, when the control piston 41 is moved upwardly (as by excessive pressure in chamber 21) so as to disengage the valve element 47 from the valve seat 46, pressure fluid flows through passages 37 and 45 past the valve seat 46 into an annular chamber 51 which is defined within the bore 43 in surrounding relationship to the valve element 47. The pressure fluid in chamber 51 can thence flow outwardly through radial ports 52 formed through the wall of the liner for communication with an annular groove 53 which externally surrounds the liner. This groove 53 in turn communicates with the further passage 38 which permits external discharge of the pressure fluid.

A sleeve-like filter or screen 54 is disposed within the groove 53 in encircling relationship to the liner so that the screen hence effectively filters all gas which flows between ports 52 and discharge passage 38. This screen 54 is preferably formed as a continuous sleeve so as to be captivated within the groove, and is of small mesh, such as approximately 20 microns.

To captivate the screen 54 relative to the liner, the upper edge of the screen abuts a shoulder formed on the liner, and the lower edge of the screen is held in place by a surrounding ring-like collar 55 which is suitably seated against a further shoulder formed on the lower end of the liner. An elastomeric O-ring 56 is compressably engaged between the lower end of the liner and the end wall 57 of the bore. This O-ring 56 exerts sufficient upward resiliency as to maintain the upper end of the liner in abutting engagement with the inner end face of the fitting 33.

The liner 42 is preferably constructed of bronze so as to prevent seizing or rusting due to moisture accumulation.

A low-force spring 58 is preferably associated with the control piston 41 for urging the latter in an opening direction. This spring 58 is disposed within the bore 43 in encircling relationship to the valve element 47. The spring 58 has the upper end abutting against a shoulder on the control piston 41, and the lower end seated on the liner end wall 44. Spring 58 always exerts a low-magnitude biasing force urging the control piston 41 and valve element 47 in an upward opening direction away from the valve seat 46.

To permit and control flow of pressure fluid from the supply line 35 into the pressure chamber 21, the liner 42 has a plurality, here four, of openings or ports 61 extending radially through the wall thereof and communicating with a shallow surrounding annular groove 62 formed in the exterior wall of the liner. This latter groove 62 is in continuous communication with the port or passage 36 which supplies pressure fluid to the chamber 21. The liner openings 61 are disposed with their radially inner ends in communication with an annular groove 63 formed in surrounding relationship to the control piston 41. This groove 63 is disposed just downstream of a one-way check valve arrangement 64 which prevents reverse or backward flow from the pressure chamber 21.

To supply pressure fluid to the check valve arrangement 64, the pressure fluid is supplied from the supply line 35 through the fitting 34 to the upper end of the control piston, from which the pressure fluid then flows downwardly through a small passage 65 which projects coaxially partway into the control piston 41. This passage 65 in turn communicates with a plurality of ports or passages 66 which project radially outwardly of the control piston for communication with the annular groove 63. The radially outer ends of these ports 66 are normally maintained closed by the one-way check valve arrangement 64, the latter preferably comprising a check valve member 67 formed as an elastomeric O-ring disposed in encircling relationship to the control piston. This O-ring is normally preferably seated within an annular groove 68 which has a substantially semi-cylindrical cross section and which directly surrounds the control piston at the radially outer ends of the ports 66.

The plurality of ports 61 which project through the liner are positioned in close proximity to the check valve member 67 but are preferably disposed with at least some of the ports 61 being in slightly axially offset relationship with respect to other such ports so as to prevent all of the ports 61 from being blocked in the event that the supply pressure causes excessive outward deformation of the O-ring 67.

The control piston 41 has a pair of conventional elastomeric sealing rings 71 mounted therearound on axially opposite sides of the groove 63 to maintain a sealed engagement with the inner wall of the liner 42. Similarly, the liner 42 has a pair of conventional elastomeric sealing rings 72 therearound on axially opposite sides of the groove 61 to maintain a sealed engagement with the wall of the bore 32.

The valve arrangement 131 may, as illustrated by FIG. 2, also be provided with a mode-selecting element 76 associated with the inlet opening 34. This mode-selecting element 76 can be manually adjusted to permit the valve assembly to be maintained normally open (that is, the valve element 47 being spaced from the valve seat 46) due to the urging of spring 58 so as to be usable in a system (as shown in FIG. 1) whereby an external pressure fluid is continuously supplied from a source 81 through a supply line 82 and selectable valve 83 into the main supply line 35, whereupon the pressure fluid then flows through the small opening 77 so a to act against the upper face 49 of the piston. This pressure fluid acting against the upper face 49 then moves the control piston 41 downwardly against the urging of spring 58, and away from the normally open position, so that the valve member 47 sealingly engages the valve seat 46. Hence, the control valve defined by seat 46 and valve element 47 is thus closed only when pressure fluid is supplied against the control face 49 defined on the other end of the control piston.

Alternately, the selector element 76 can be adjusted inwardly (downwardly) due to its threaded engagement 78 with the fitting 35 until the end of the control element 76 abuts the piston end face 49 to positively hold the control piston in a closed or seated position wherein the valve element 47 is positively maintained seated against the valve seat 46. In this latter condition, the valve arrangement hence positively closes off the pressure chamber 21 so that the spring unit 10 can hence be utilized as a self-contained pressure unit without requiring attachment to an external pressure system.

The selector element 76 in the illustrated embodiment is formed similar to a conventional screw so that it can be threaded either inwardly or outwardly by a conventional tool, such as a screwdriver. This element 76 is also preferably formed of a hard plastics material.

It will be recognized that, if it is intended that the valve arrangement 131 always be connected to an external supply 81 of pressure fluid, then the mode-selector element 76 can be removed from the valve arrangement if desired. Alternately, as illustrated by FIG. 3, a separate elastomeric sealing ring 85 can be inserted into the valve arrangement so as to be disposed between the fitting 34 and the control piston 41 so as to hold the latter in a closed (that is lowermost) position. Such sealing ring 85 can be permanently seated on the inner end of the fitting 34 and functions in a manner identical to the selector element 76 except, in this situation, the complete fitting 34 is manually rotated either inwardly or outwardly in order to permit the mode selection to take place. The embodiment of FIG. 2 is preferred, however, since the mode selector 76 can be adjusted independently of the fitting 34.

OPERATION

With the spring unit 10 in the position illustrated by FIG. 1, the high-pressure gas can be supplied to the spring unit to charge same by connecting the unit as illustrated in FIG. 1, whereby the high-pressure gas flows from the source or tank 81 into the supply port 34. The high-pressure gas moves the control piston 41 downwardly so that the valve element 47 sealingly engages the valve seat 46. The high-pressure gas flows through passage 65 in the control piston and thence outwardly through radial ports 66, whereupon the pressure dislodges the O-ring 67 so that the pressurized gas thence flows through ports 61 into the passage 36 and thence into the pressure chamber 21. When the pressure chamber 21 reaches the desired pressure as controlled by a pressure regulator (not shown), or when the pressure within chamber 21 substantially equals but is normally slightly less than the pressure within the tank 81, then the pressure within chamber 21 acting against the larger area of the O-ring 67 is sufficient to cause the O-ring to sealingly close off the outer ends of the ports 66.

With the pressure in chamber 21 at its normal level, the piston rod 14 will normally be fully extended as illustrated so as to permit imposition of an impact force thereon. When such impact force is imposed against the end of piston rod 14 so as to cause inward movement (leftward movement) in FIG. 1, the compressed gas within chamber 21 remains trapped within the spring unit since the one-way check valve 64 prevents backward flow of gas therethrough. Similarly, the valve element 47 remains seated against the valve seat 46. This is due to the fact that the area of the valve element which is exposed to the high-pressure gas in the chamber 21, namely that area defined by the inner diameter of the valve seat 46, is a small fraction of the pressure area 49 at the other end of the control piston which is exposed to the supply pressure. In fact, the pressure area of face 49 is several times greater than the exposed area of the valve element 47 as defined by the diameter of passage 45. Hence, even though the pressure within compartment 21 may increase significantly upon imposition of an impact force against the piston rod 14, nevertheless the valve 46-47 remains closed.

However, if a pressure in excess of a predetermined magnitude should be developed within the pressure chamber 21, then this high pressure within the passages 37 and 45 acting against the exposed area of the valve element 47 is sufficient to overcome the smaller pressure which acts against the piston end face 49, and hence the valve element 47 and control piston 41 are moved upwardly a limited extent. Some of the high-pressure fluid then flows past the valve seat 46 into chamber 51, thence through ports 52 and passage 38 for discharge to the surrounding environment.

Further, when the pressure fluid flows into the chamber 51 due to opening of the valve 46-47, this pressure fluid now effectively acts against the complete cross sectional area of the control piston 41, which area is substantially equal to the area of the upper end face 49. The pressure fluid in chamber 51 hence effectively overcomes or balances the pressure against the upper face 49 so that the control piston 41 remains in its uppermost open position until the pressure in chamber 21 decreases to a safe operating level which is substantially equal to the initial charging pressure. At this point the control piston will again be moved downwardly to seat the valve element 47 against the valve seat 46.

When it is desired to relieve the pressure from the spring unit 10, such as for maintenance purposes, then the valve 83 is manually moved to close off the supply 81 and hence connect the supply pipe 35 to a low pressure drain 84. This thus relieves the pressure against the upper end face 49 of the control piston, whereupon the pressure in passage 45 as assisted by the spring 58 is sufficient to move the control piston 41 upwardly into its open position so as to permit draining of the pressure chamber 21.

PREFERRED EMBODIMENTS

Referring now to FIG. 4, there is illustrated a preferred embodiment of a valve arrangement 231 for use in conjunction with a spring unit 10 as illustrated by FIG. 1. More specifically, the valve arrangement 231 of FIG. 4 is substituted for the valve arrangement 31 of FIG. 1 in substantially the same manner described above relative to the valve arrangement 131.

The valve arrangement 231 of FIG. 4 possess many of the same structural and functional relationships as the valve arrangement 131 of FIG. 2, and hence the parts in FIG. 4 which structurally and functionally correspond to those in FIG. 2 have been designated by the same reference numerals.

The valve arrangement 231 of FIG. 4 is designed specifically for use in a gas spring unit which is part of a system. That is, the spring unit 10 and its valve arrangement 231 are designed to be operated only when connected to a source of pressurized gas through a supply line or conduit 35. Hence, with this arrangement, the discharge port 38 (FIG. 2) is no longer necessary, and hence such port 38 is either eliminated or plugged.

In the valve arrangement 231 illustrated by FIG. 4, the intermediate pressure chamber 51 as disposed downstream of the valve seat 46 is sealingly isolated from direction communication with the surrounding environment due to elimination or blockage of the discharge port 38 (FIG. 2). However, chamber 51 does communicate with a passage 91 which extend transversely through the control piston 41, and passage 91 in turn communicates with a further passage 92 which is formed coaxially of the piston in alignment with the main supply passage 65. The further passage 92, however, is normally isolated from the supply passage 65 by a normally-closed one-way check valve 93 interposed therebetween. This check valve 93 is positioned downstream of the radial ports 66 so as to not interfere with the supply of pressure fluid to the chamber 21.

The check valve 93 includes a conventional movable valve element 94, preferably a ball constructed of an elastomeric material, the latter being normally urged by a spring 96 into engagement with an annular valve seat 95 which surrounds the passage 92. The cross sectional area of passage 92 is significantly less than the diametral cross sectional area of ball 94. The spring 96, at its other end, is seated against a stop member 97 which is fixedly secured to the control piston 41. For manufacturing convenience, the passage 65 is internally threaded, and the stop member 97 is externally threaded so that it can be stationarily positioned as desired along the passage 65. This stop member 97 is disposed so that it is downstream of the radial ports 66. Stop member 97 has an opening 98 extending therethrough so that the pressure fluid in passage 65 will pass therethrough and be applied against the entire cross sectional area of the ball 94 so that this pressure, in conjunction with the spring 96, hence normally maintains the ball 94 sealingly engaged with the valve seat 95. The opening 98 is preferably not coaxially aligned with passage 65, but rather is sidewardly offset, to prevent any accidental or unintentional closing of the downstream end of passage 98 by means of the ball 94.

With this arrangement of FIG. 4, the liner 42 can also be simplified since it does not need discharge ports therethrough, nor does it need a surrounding filter.

With the valve arrangement 231 of FIG. 4, the supplying of pressurized gas to the chamber 21 occurs in the same manner as described above relative to the embodiment of FIG. 2.

Similarly, the valve element 47 is normally maintained in closed sealing engagement with the valve seat 46 due to the pressure fluid acting against the upper face 49 of the piston. In case of excessive pressure within the chamber 21, however, this pressure acting through passages 37 and 45 causes the control piston 41 to lift upwardly into an open position when the pressure in chamber 21 exceeds a predetermined magnitude, in the same manner as explained with respect to FIG. 2. However, with the valve arrangement of FIG. 4, when the pressure fluid reaches the chamber 51, it then passes into the passageways 91 and 92 so that it lifts the check valve ball 94 upwardly into an open position, thereby permitting the excess pressure to escape back into the supply line 35 until the pressure is again sufficiently equalized as to permit reclosing of the check valve 93. In the event of a severe excess pressure within the chamber 21, the supply line 35 itself has a suitable rupturable pressure release device associated therewith, this being a conventional device, so as to relieve pressure within the line 35 if necessary. However, the size and capacity of the line 35, and the fact that this line 35 will conventionally be coupled to a plurality of similar high-pressure gas springs, is normally sufficient to absorb the pressurized gas which is fed back into the line 35 through the opened check valve 93.

The valve arrangement 231 of FIG. 4 is also highly desirable for preventing leakage from the gas spring. For example, if leakage should occur past the valve seat 46, such as due either to wear or to trappage of containments between the valve element and the valve seat, the gas which leaks from the pressure chamber 21 is not lost to the environment, but rather will pass into and collect within the chamber 51. When the pressure level within the chamber 51 is sufficient, it will momentarily open the check valve 93 and hence permit this gas to be resupplied to the supply line 65, from which pressurized gas will again be automatically resupplied through the check valve 67 into the pressure chamber 21 as necessary. In this matter leakage is substantially prevented in that any leakage is returned to the supply line and hence the quantity of gas in the system is effectively recycled.

Referring to FIGS. 5 and 6, there is illustrated a valve arrangement 231' which closely corresponds to the valve arrangement 231 of FIG. 4, and hence corresponding parts of the valve arrangement 231' are designated by the same reference numerals appearing in FIG. 4 except for the addition of a prime (') thereto.

As shown in FIG. 5, the valve arrangement 231' includes a control piston 41' slidably disposed within the bore 43' of a sleeve-like liner 42', which liner is seated within a bore 32' formed in the end cap 17' of the spring housing 16'. The valve arrangement 231' is held within the housing bore 32' by a threaded plug 33', the latter abutting the outer end of the liner. The structural and functional relationships of the valve arrangement 231' are identical to those of the valve arrangement 231 illustrated in FIG. 4, so that further detailed illustration and description of valve arrangement 231' are believed unnecessary.

In this variation of FIG. 5, the housing bore 32' extends axially inwardly from the outer face of the end cap 17' substantially in coaxial alignment with the longitudinal axis 15' of the gas spring. To permit minimization of the thickness of the end cap 17', the bore 32' extends axially therethrough for coaxial communication with the pressure chamber 21'. The valve arrangement 231' and specifically the liner 42' and control piston 41' hence are seated within the bore 32' and project axially through the bore into the pressure chamber 21'. The inward axial projection of the valve arrangement 231' is accommodated due to the hollow interior of the piston and piston rod when the latter are in the position indicated by dotted lines in FIG. 5. To axially and stationarily position the liner 42' relative to the end cap, the liner has a surrounding annular flange at its outer end which overlaps a shoulder formed in surrounding relationship to the bore 32', with an annular elastomeric O-ring 56' being confined therebetween. The outer axial free end of the liner 42' abuts the plug 33' (which plug in this variation does not have a flow passage extending coaxially therethrough). Plug 33' sealingly closes off the outer end of the bore 32'.

To provide convenient supply of pressurized gas to the valve arrangement 231', the end cap 17' has a plurality of supply ports 134 which are formed therein and project radially outwardly from the bore 32' for communication with the surrounding peripheral sidewall of the end cap. The end cap preferably has at least two such ports 134 formed therein for communication with diametrically opposite sides of the bore 32', and in the illustrated embodiment is provided with four such ports 134 disposed uniformly angularly spaced around the bore 32'. Each of these supply ports 134 has its radially inner end communicating with an annular clearance passage which is defined between the wall of bore 32' and the plug 33'. The plug 33' has a slot or passage 101 extending transversely across the inner end face thereof for communication with the interior of the liner 42'. Only one of the supply ports 134 need be connected to an exterior pressure source, and the remaining ports may be sealingly closed by means of plugs.

With the arrangement of FIG. 5, the mounting of the gas spring 10' and the connecting thereof to an external pressure source is greatly facilitated. For example, the gas spring 10' can be mounted without concern as to orienting its supply port relative to the external supply source. After mounting of the gas spring 10', then the external gas source can be readily connected to the gas spring by being connected through conventional plumbing-type connections to whichever supply port 134 is most conveniently oriented. In this manner, the plumbing between the gas spring and the supply source can be most direct, and the number of fittings can be significantly minimized, thereby reducing the number of potential leakage points, this being significant when dealing wit high-pressure nitrogen. With this improved arrangement, the gas spring can also be connected to multiple exterior pressure supplies since two or more of the ports 134 can be connected to exterior pressure supplies if desired.

Other than the axial orientation of the valve arrangement 231' and the provision of multiple radially-directed supply ports, the valve arrangement 231' otherwise structurally and functionally cooperates and operates in the same manner as the valve arrangement 231 of FIG. 4 as described above. With this valve arrangement 231', however, as is apparent from FIG. 5, the housing passages 36 and 37 of FIG. 4 are basically eliminated inasmuch as the liner 42' of FIG. 5 projects directly into the pressure chamber 21' so that the passages or openings 45' and 61' communicate directly with the pressure chamber 21'.

The valve arrangements illustrated by FIGS. 2, 4 and 5 possess several structural and operational advantages, as follows:

1. By positioning the control piston within a separate liner which itself is removably supported within the bore of the housing end cap, this permits both the liner and the piston to be precisely machined both with respect to concentricity and depth dimensions, and hence provides for more control over proper sealing engagement between the valve element 47, 47' and the valve seat 46. The proper sealing engagement between the valve element and the seat is critical, and the overall control of the depth dimensions is likewise critical to ensure a proper seating between the valve element and seat. Control over the machine dimensions is much more easily achieved using a separate liner, rather than having to form the valve seat on the end plate inasmuch as the end plate is subject to distortion and warpage due to the necessity of welding the plate to the housing.

2. The use of the plastic piston in combination with the brass liner greatly facilitates proper operation. In many instances units of this type sit in storage for many months prior to use, and oftentimes the units are stored outside and are subjected to rain and snow. Moisture tends to leak into the valve assembly and can cause rusting so that the piston tends to stick within the bore. This problem is eliminated by using the plastic piston and brass liner of this variation.

3. By having the ports 61, 61' in the liner disposed in axially staggered relationship, this prevents the O-ring 67, 67' from covering all of the ports if a sudden charging pressure is applied.

4. The use of the separate liner 42, 42' for supporting the piston greatly minimizes problems caused by lack of concentricity or alignment between the valve seat and the piston, and in fact if such problem exists, the liner can be inexpensively scrapped and replaced with a new liner. Such is not possible when the valve seat is formed on the head plate. Further, the use of a separate liner 42, 42' and the resilient O-ring 56, 56' urging the liner against the fitting 33, 33' compensates for dimensional tolerances in axial depth.

5. By providing the spring 58 which always exerts a small biasing force in the opening direction, this permits proper discharge of gas pressure from within the unit. In some situations, if the overall unit has not been discharged for a long period of time, the piston O-rings tend to set or stick against the liner, and the internal pressure may not be large enough to open the piston. By adding a supplemental spring force created by the spring 58, this is sufficient to combine with the pressure force to ensure proper opening of the valve.

6. The provision of the filter or screen (in the valve 131 of FIG. 2) prevents contaminants such as abrasive dust and dirt from leaking into the valve assembly. These units are often stored in dirty environments. The screen prevents external contaminants from gaining access into the interior of the unit. Any such contaminants are effectively stopped by the screen. In addition, by making this screen as a continuous sleeve, this prevents the screen from being blown out into the discharge passage due to sudden pressure.

7. The same valve arrangement (e.g. the valve 131 of FIG. 2) can be provided on all of the high-pressure spring units, and such units can then be readily adapted, merely by adjusting the position of the selector element 76 for use either as part of a system or as a self-contained unit.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, a gas spring arrangement comprising:
   a gas spring unit having a housing, a piston rod means relatively slidably supported within said housing and projecting outwardly therefrom, the piston rod means being slidably movable relative to the housing between a first position wherein the rod means extends outwardly of the housing through a substantial extend and a second position wherein the rod means is substantially telescoped within the housing, the housing and the rod means cooperating to define a pressure chamber therebetween for containing a quantity of high-pressure gas therein; said housing defining bore means therein;
   a valve arrangement positioned within said bore means for controlling flow of pressure fluid both into and out of said pressure chamber;
   first passage means communicating with said bore means for permitting a pressure fluid to be supplied thereto, and second passage means providing communication between said bore means and said pressure chamber for permitting pressure fluid to be supplied through said second passage means into said pressure chamber;
   third passage means providing communication between said pressure chamber and said bore means, and fourth passage means providing communication between said bore means and a discharge point;
   said valve arrangement including first one-way check valve means coacting between said first and second passage means for permitting high-pressure gas to be supplied from said first passage means into said second passage means and thence into said pressure chamber while preventing flow of said gas in the opposite direction;

said valve arrangement also including second flow-control valve means coacting between said third and fourth passage means for controlling flow of gas from said third passage means into said fourth passage means for discharge;

said valve arrangement including a separate removable sleeve-like liner supported within said bore means, and a control piston sealingly and slidably supported within said liner, said one-way check valve means being mounted on said control piston, and said flow-control valve means including an annular valve seat formed on said liner and a valve element fixedly associated with said piston and being movable along with said piston into a closed position wherein it sealingly engages the valve seat for closing off said third passage means.

2. A combination according to claim 1, including manually-adjustable selector means coacting with said valve arrangement for permitting the spring unit to be used either as part of a system or as a self-contained unit, said selector means comprising a selector member movably supported on said housing for movement between a first position wherein it is spaced from said control piston for permitting slidable movement of the piston so that the unit can be part of a system and a second position wherein it abuts and holds the control piston in said closed position for permitting the unit to function as a self-contained unit.

3. A combination according to claim 2, wherein said selector member is threadably supported on said housing adjacent one end of said control piston and is rotatably threadably movable relative to said housing between said first and second positions, said selector member having a small opening extending axially therethrough and forming a part of said first passage means.

4. A combination according to claim 1, wherein said third passage means includes a first passage portion formed in said housing and providing communication between said pressure chamber and said bore means, and a second passage portion formed in an end wall of said liner and disposed in continuous communication with said first passage portion, said second passage portion terminating at said valve seat;

said fourth passage means including a third passage portion providing communication between said bore means and said discharge point, and a fourth passage portion extending radially through the wall of said liner and in continuous communication with said third passage portion, said fourth passage portion where it extends through the wall of said liner communicating with the interior of said liner in the vicinity of said valve element; and screen means mounted on said liner in externally surrounding relationship thereto for preventing external contaminates from passing through said third passage portion into said fourth passage portion, said annular screen means extending across the radially outer end of said fourth passage portion, said screen means being confined between said liner and said housing.

5. A combination according to claim 4, wherein said liner is constructed of brass and said control piston is constructed of a plastic material.

6. A combination according to claim 1, wherein said bore means includes an inner wall on which said liner is slidably supported, said inner wall adjacent one end being joined to an axially outwardly facing wall, said bore means including a threaded bore which communicates with an outer end of said inner wall and opens outwardly of said housing, a fitting threadably engaged within said threaded bore and having one end thereof disposed in abutting engagement with an adjacent end of said liner, and an elastomeric ring member seated within said bore means and axially compressibly engaged between said liner and said outwardly facing wall.

7. A combination according to claim 1, wherein said one-way check valve means includes a first passage portion formed in said control piston and having an upstream end in continuous communication with said first passage means, said first passage portion terminating in a plurality of radial passages of small cross section which open radially outwardly of said control piston into a surrounding annular groove formed in said control piston, said one-way check valve means also including an annular elastomeric O-ring mounted on said control piston in surrounding relationship thereto within said annular groove for normally maintaining the radially outer ends of said radial passages closed, said one-way check valve means also including a plurality of circumferentially spaced holes extending radially through said liner, said holes providing flow communication between said annular groove and said second passage means, at least some of said holes being in axially spaced relationship relative to one another to prevent the elastomeric O-ring from accidentally covering all of said holes due to application of a sudden charging pressure.

8. A combination according to claim 1, including spring means disposed within said liner and axially coacting between said liner and said control piston for normally urging said control piston axially in a direction away from said closed position.

9. A combination according to claim 1, wherein said fourth passage means includes an intermediate chamber which is located downstream of said annular valve seat and is defined between said control piston and said liner, said fourth passage means also including an interior passage formed in said control piston and extending between said intermediate chamber and said first passage means, and third one-way check valve means associated with said interior passage for permitting high-pressure gas to be supplied therethrough from said intermediate chamber into said first passage means while preventing flow of gas in the opposite direction, said third one-way check valve means being maintained in a closed condition whenever said second flow-control valve means is closed.

10. A combination supply and discharge valve assembly for permitting pressurized gas to be supplied to and discharged from a pressure chamber, such as a pressure chamber of a gas spring unit, comprising:

a housing defining bore means therein;

a valve arrangement positioned in said bore means for controlling flow of pressure fluid both into and out of said pressure chamber;

first passage means communicating with said bore means for permitting a pressure fluid to be supplied thereto, and second passage means providing communication between said bore means and said pressure chamber for permitting pressure fluid to be supplied through said second passage means into said pressure chamber;

third passage means providing communication between said pressure chamber and said bore means, and fourth passage means providing communication between said bore means and a discharge point;

said valve arrangement including first one-way check valve means coacting between said first and second passage means for permitting high-pressure gas to be supplied from said first passage means into said second passage means and hence into said pressure chamber while preventing flow of said gas in the opposite direction;

said valve arrangement also including second flow-control valve means coacting between said third and fourth passage means for controlling flow of gas from said third and fourth passage means for controlling flow of gas from said third passage means into said fourth passage means for discharge to said discharge point;

said valve arrangement including a separate removable sleeve-like liner supported within said bore means, and a control piston sealingly and slidably supported within said liner, said one-way check valve means being mounted on said control piston, and said flow-control valve means including an annular valve seat formed on said liner and a valve element fixedly associated with said piston and being movable along with said piston into a closed position wherein it sealingly engages the valve seat for closing off said third passage means.

11. A valve assembly according to claim 10, wherein said second and third passage means communicate with said bore means at spaced locations thereof so as to be independent of one another.

12. A valve assembly according to claim 10, including manually-adjustable selector means coacting with said valve arrangement for permitting the spring unit to be used either as part of a system or as a self-contained unit, said selector means comprising a selector member movably supported on said housing for movement between a first position wherein it is spaced from said control piston for permitting slidable movement of the piston so that the unit can be part of a system and a second position wherein it abuts and holds the control piston in said closed position for permitting the unit to function as a self-contained unit.

13. A valve assembly according to claim 10, wherein said third passage means includes a first passage portion formed in said housing and providing communication between said pressure chamber and said bore means, and a second passage portion formed in an end wall of said liner and disposed in continuous communication with said first passage portion, said second passage portion terminating at said valve seat;

said fourth passage means including a third passage portion providing communication between said bore means and said discharge point, and a fourth passage portion extending radially through the wall of said liner and in continuous communication with said third passage portion, said fourth passage portion where it extends through the wall of said liner communicating with the interior of said liner in the vicinity of said valve element; and screen means mounted on said liner in externally surrounding relationship thereto for preventing external contaminates from passing through said third passage portion into said fourth passage portion, said annular screen means extending across the radially outer end of said fourth passage portion, said screen means being confined between said liner and said housing.

14. A valve assembly according to claim 10, wherein said bore means includes an inner wall on which said liner is slidably supported, said inner wall being joined to an axially outwardly facing wall, said bore means including a threaded bore which communicates with an outer end of said inner wall and opens outwardly of said housing, a fitting threadably engaged within said threaded bore and having one end thereof disposed in abutting engagement with an adjacent end of said liner, and an elastomeric ring member seated within said bore means and axially compressibly engaged between said liner and said outwardly facing wall.

15. A valve assembly according to claim 10, wherein said one-way check valve means includes a first passage portion formed in said control piston and having an upstream end in continuous communication with said first passage means, said first passage portion terminating in a plurality of radial passages of small cross section which open radially outwardly of said control piston into a surrounding annular groove formed in said control piston, said one-way check valve means also including an annular elastomeric O-ring mounted on said control piston in surrounding relationship thereto within said annular groove for normally maintaining the radially outer ends of said radial passages closed, said one-way check valve means also including a plurality of circumferentially spaced holes extending radially through said liner, said holes providing flow communication between said annular groove and said second passage means, at least some of said holes being in axially spaced relationship relative to one another to prevent the elastomeric O-ring from accidentally covering all of said holes due to application of a sudden charging pressure.

16. A valve assembly according to claim 10, wherein said fourth passage means includes an intermediate chamber which is located downstream of said annular valve seat and is defined between said control piston and said liner, said fourth passage means also including an interior passage formed in said control piston and extending between said intermediate chamber and said first passage means, and third one-way check valve means associated with said interior passage for permitting high-pressure gas to be supplied therethrough from said intermediate chamber into said first passage means while preventing flow of gas in the opposite direction, said third one-way check valve means being maintained in a closed condition whenever said second flow-control valve means is closed.

17. In combination, a gas spring arrangement comprising:

a gas spring unit having a housing, a piston rod means relatively slidably supported within said housing and projecting outwardly therefrom, the piston rod means being slidably movable relative to the housing between a first position wherein the rod means extends outwardly of the housing through a substantial extent and a second position wherein the rod means is substantially telescoped within the housing, the housing and the rod means cooperating to define a pressure chamber therebetween for containing a quantity of high-pressure gas therein;

said housing defining bore means therein;

a valve arrangement positioned within said bore means for controlling flow of pressure fluid both into and out of said pressure chamber;

first passage means communicating with said bore means for permitting a pressure fluid to be supplied thereto, and second passage means providing communication between said bore means and said pressure chamber for permitting pressure fluid to be supplied through said second passage means into said pressure chamber;

third passage means providing communication between said pressure chamber and said bore means, and fourth passage means providing communication between said bore means and a discharge point;

said valve arrangement including first one-way check valve means coacting between said first and second passage means for permitting high-pressure gas to be supplied from said first passage means into said second passage means and thence into said pressure chamber while preventing flow of said gas in the opposite direction;

said valve arrangement also including second flow-control valve means coacting between said third and fourth passage means for controlling flow of gas from said third passage means into said fourth passage means for discharge;

said valve arrangement including a control piston sealingly and slidably supported within said bore means, said first one-way check valve means being mounted on said control piston;

said flow-control valve means including a stationary annular valve seat and a valve element fixedly associated with said piston and being movable along with said piston into a closed position wherein it sealingly engages the valve seat for closing off said third passage means;

said fourth passage means including an intermediate chamber which is located downstream of said annular valve seat and is defined between said control piston and said bore means, said fourth passage means also including an interior passage formed in said control piston and extending between said intermediate chamber and said first passage means; and third one-way check valve means associated with said interior passage for permitting high-pressure gas to be supplied therethrough from said intermediate chamber into said first passage means while preventing flow of gas in the opposite direction, said third one-way check valve means being maintained in a closed condition whenever said second flow-control valve means is closed.

18. A combination according to claim 17, wherein said one-way check valve means includes a first passage portion formed in said control piston and having an upstream end in continuous communication with said first passage means, said first passage portion terminating in a plurality of radial passages of small cross section which open radially outwardly of said control piston into a surrounding annular groove formed in said control piston, said one-way check valve means also including an annular elastomeric O-ring mounted on said control piston in surrounding relationship thereto within said annular groove for normally maintaining the radially outer ends of said radial passages closed.

19. A combination according to claim 17, including spring means disposed within said bore means and normally urging said control piston axially in a direction away from said closed position.

20. A combination according to claim 17, including manually-adjustable selector means coacting with said valve arrangement for permitting the spring unit to be used either as part of a system or as a self-contained unit, said selector means comprising a selector member movably supported on said housing for movement between a first position wherein it is spaced from said control piston for permitting slidable movement of the piston so that the unit can be part of a system and a second position wherein it abuts and holds the control piston in said closed position for permitting the unit to function as a self-contained unit.

21. A combination according to claim 1, wherein said housing includes an annular side wall having first and second end caps fixed thereto adjacent opposite axial ends thereof, said piston rod means projecting slidably through said second end cap, said pressure chamber being defined within said side wall between said piston rod means and said first end cap, said bore means being formed in said first end cap substantially in coaxial alignment with the longitudinal axis of said piston rod means, said first passage means including a plurality of supply ports formed in said first end cap, said plurality of supply ports communicating with said bore means at circumferentially spaced locations and projecting radially outwardly from said bore means in angularly spaced relationship to one another so that said supply ports open outwardly through the peripheral side wall of said first end cap at circumferentially displaced locations, and means for sealingly closing off the axially outer end of said bore means.

22. A combination according to claim 21, wherein said bore means projects axially through said first end cap for communication with said pressure chamber, said liner being axially stationarily seated within said bore means and projecting axially therethrough into said pressure chamber, and said piston rod means having central opening means therein which define part of said pressure chamber for accommodating the axial projection of said liner.

23. A valve assembly according to claim 16, wherein said third passage means is defined by an opening which is formed in an end wall of said liner and is disposed in continuous communication with said pressure chamber, said opening terminating at said valve seat.

24. A valve assembly according to claim 10, wherein said first passage means includes a plurality of supply ports formed in said housing and communicating with said bore means adjacent an axially outer end of said liner in circumferentially spaced relationship around said bore means, said plurality of supply ports projecting generally radially outwardly of said housing from said bore means in circumferentially spaced relationship therearound, at least one of said supply ports being adapted for connection to an external source of pressurized gas, and plug means positioned within said bore for abutting the one axial end of said liner and for sealingly closing off the outer axial end of said bore means.

25. A valve assembly according to claim 24, wherein said second passage means includes at least one opening formed through a side wall of said liner for communication with said pressure chamber.

26. A valve assembly according to claim 25, wherein said liner adjacent the other axial end thereof has a transversely extending end wall, said third passage means comprising an opening extending axially through said end wall and terminating in said valve seat as defined adjacent an inner surface of said end wall.

27. A combination according to claim 17, including a sleeve-like liner stationarily and sealingly seated at least partially within said bore means, said liner being separate from said housing and removable from said bore means, said control piston being axially slidably and sealingly supported within a bore as defined within said liner.

28. A combination according to claim 27, wherein said liner is constructed of brass and said control piston is constructed of a plastics material.

29. A combination according to claim 28, wherein said liner has an end wall extending transversely thereacross adjacent one end thereof, said third passage means comprising an opening formed in and extending axially through the end wall of said liner and terminating in said annular valve seat in surrounding relationship to said opening adjacent an inner surface of said end wall, said opening being in continuous communication with said pressure chamber.

30. In a high-pressure gas spring unit, comprising:
housing means including a sleeve-like sidewall having first and second end caps fixed thereto adjacent opposite ends thereof;
piston means axially slidably supported within said housing means for slidable displacement substantially parallel to the longitudinal axis of said housing means, said piston means having rod means fixed thereto and projecting slidably through said second end cap, said housing means and said piston means cooperating to define a pressure chamber between said piston means and said first end cap for containing a quantity of high-pressure gas therein;
a valve arrangement mounted on said first end cap for controlling flow of pressure fluid both into and out of said pressure chamber;
bore means of substantially cylindrical configuration formed in said first end cap in substantially coaxial alignment with said longitudinal axis, and said valve arrangement being disposed in said bore means;
plug means stationarily mounted on said first end cap for sealingly closing off the axial outer end of said bore means;
first passage means communicating with said pressure chamber for permitting supply of high-pressure gas thereto;
said valve arrangement including first one-way check valve means associated with said first passage means for permitting high-pressure gas to be supplied into said pressure chamber while preventing flow of said gas in the opposite direction;
said first passage means including a first passage portion which communicates with an upstream side of said first one-way check valve means and a second passage portion which communicates between a downstream side o said first one-way check valve means and said pressure chamber, said first passage portion including a plurality of supply passages formed in said first end cap and communicating with said bore means, said plurality of supply passages projecting radially outwardly from said bore means in angularly spaced relationship therearound so that said supply passages open outwardly through a peripheral sidewall of said first end cap;
second passage means for providing communication between said pressure chamber and a lower-pressure discharge point;
said valve arrangement including second flow-control valve means for controlling flow of gas through said second passage means in a direction from said pressure chamber to said lower-pressure discharge point, said second flow-control valve means including a stationary annular valve seat and a movable valve element adapted for sealingly engaging the valve seat for closing off said second passage means; and
said second passage means including a third passage portion which provides communication between said pressure chamber and said valve seat, and a fourth passage portion which provides communication from said valve seat to said lower-pressure discharge point.

31. A gas spring according to claim 30, including a sleeve-like liner removably but sealingly and stationarily supported within said bore means, said valve arrangement including a control piston sealingly and slidably supported within said liner for movement generally parallel with said axis, said control piston acting against said valve element for urging the valve element against said valve seat, said first one-way check valve means being mounted on said control piston.

32. A gas spring according to claim 31, wherein said valve seat is formed on said liner and said valve element is captivated between said valve seat and said control piston, said third passage portion being defined at least in part by an opening formed in said liner.

33. A gas spring according to claim 32, wherein said fourth passage portion communicates at its downstream end with said first passage portion, and third one-way check valve means associated with said fourth passage portion for permitting flow therethrough in a direction from said valve seat toward said first passage portion while preventing flow therethrough in the reverse direction.

34. A gas spring according to claim 33, wherein said third one-way check valve means is mounted on said control piston.

35. A gas spring according to claim 30, wherein said fourth passage portion at its downstream end communicates with said first passage portion, and third one-way check valve means associated with said fourth passage portion for permitting flow therethrough in a direction from said valve seat toward said first passage portion while preventing flow therethrough in the reverse direction.

36. A gas spring according to claim 35, wherein said valve arrangement includes a control piston slidably and sealingly supported relative to said bore means, each of said first and third one-way check valve means being mounted on said control piston.

37. In combination, a gas spring arrangement comprising:
a gas spring unit having a housing, piston means relatively slidably supported within said housing and having rod means projecting outwardly therefrom, said piston means being slidably movable relative to the housing between a first position wherein the rod means extends outwardly of the housing through a substantial extent and a second position wherein the rod means is substantially telescoped within the housing, the housing and the piston means cooperating to define a pressure chamber therebetween for containing a quantity of high-pressure gas therein;

inlet passage means formed at least partially in said housing and communicating with said pressure chamber for supplying high-pressure gas thereto, said inlet passage means being adapted for communication with an external source of high-pressure gas;

first one-way check valve means mounted on said housing and associated with said inlet passage means for permitting flow of high-pressure gas through said inlet passage means into said pressure chamber while preventing flow in the opposite direction;

discharge passage means providing communication between said pressure chamber and a lower-pressure discharge point, said discharge passage means being independent of said inlet passage means;

discharge flow-control valve means mounted on said housing and associated with said discharge passage means for selectively controlling flow of pressure gas therethrough from said pressure chamber to said lower-pressure discharge point, said discharge valve means including a valve element which is movable between open and closed positions, and said discharge valve means including a control member which responds to the presence of a significant pressure within said inlet passage means upstream of said first check valve means for normally maintaining said valve element in its closed position;

said discharge passage means including a discharge passage portion which at one end communicates with a downstream side of said flow-control valve means and which at its other end communicates with said inlet passage means upstream of said first one-way check valve means for permitting discharged gas to be supplied back to said inlet passage means; and second one-way check valve means associated with said discharge passage portion for permitting flow of discharged gas through said discharge passage portion back into said inlet passage means while preventing flow in the opposite direction.

38. An air spring according to claim 37, wherein said second one-way check valve means is mounted on said control member.

39. An air spring according to claim 38, wherein said discharge passage portion is formed at least in part in said control member, wherein said inlet passage means is formed at least in part in said control member, and said first one-way check valve means is mounted on said control member.

* * * * *

UNITED STATES PATENT AND TRADEMARK OFFICE
CERTIFICATE OF CORRECTION

PATENT NO. : 4 813 655

DATED : March 21, 1989

INVENTOR(S) : Ransom J. HENNELLS

It is certified that error appears in the above-identified patent and that said Letters Patent is hereby corrected as shown below:

Column 15, line 10; change "hence" to ---thence---.

Column 19, line 60; change "side o said" to ---side of said---.

Signed and Sealed this

Seventh Day of November, 1989

Attest:

JEFFREY M. SAMUELS

Attesting Officer

Acting Commissioner of Patents and Trademarks